(12) United States Patent
Barbee

(10) Patent No.: US 6,746,028 B2
(45) Date of Patent: Jun. 8, 2004

(54) GAME ANIMAL TRANSPORT DEVICE

(76) Inventor: Ronald D. Barbee, 530 W. "A" St., Burns, OR (US) 97720

( * ) Notice: Subject to any disclaimer, the term of this patent is extended or adjusted under 35 U.S.C. 154(b) by 0 days.

(21) Appl. No.: 10/208,698

(22) Filed: Jul. 29, 2002

(65) Prior Publication Data

US 2004/0017053 A1 Jan. 29, 2004

(51) Int. Cl.$^7$ .............................................. B62B 13/16
(52) U.S. Cl. .......................... 280/20; 280/24; 280/18; 280/603
(58) Field of Search .............................. 280/18, 19, 20, 280/32, 32.5, 32.6, 87.05, 47.18, 33.991, 603; 108/53.3, 901, 902

(56) References Cited

U.S. PATENT DOCUMENTS

| | | | | |
|---|---|---|---|---|
| 961,856 A | * | 6/1910 | Heckman | 280/24 |
| 1,583,693 A | * | 5/1926 | Krafft | 280/20 |
| 2,469,765 A | * | 5/1949 | Fish | 280/18 |
| 2,627,422 A | * | 2/1953 | Pagelkoff | 280/18 |
| 2,813,727 A | * | 11/1957 | Whalen | 280/408 |
| 2,927,799 A | * | 3/1960 | Schnitzler | 280/18 |
| 3,576,214 A | * | 4/1971 | Ratcliffe | 172/393 |
| 3,625,533 A | * | 12/1971 | Boe | 280/18 |
| 3,666,282 A | * | 5/1972 | Buening et al. | 280/18 |
| 3,771,808 A | | 11/1973 | Duerst | 280/19 |
| 3,799,566 A | * | 3/1974 | Thompson | 280/18 |
| 3,825,360 A | * | 7/1974 | Galich | 403/294 |
| 3,912,290 A | * | 10/1975 | Rich | 280/9 |
| 3,982,748 A | * | 9/1976 | Hooper et al. | 280/18 |
| 4,155,568 A | * | 5/1979 | Galich | 280/603 |
| 4,239,247 A | * | 12/1980 | Hinz | 280/19.1 |
| 4,286,752 A | * | 9/1981 | Cheng | 238/10 F |
| 4,335,891 A | * | 6/1982 | Alley et al. | 280/19 |
| 5,860,369 A | * | 1/1999 | John et al. | 108/57.26 |
| 5,897,131 A | * | 4/1999 | Brown et al. | 280/7.12 |
| 5,941,541 A | | 8/1999 | Minkus | 280/20 |
| 6,550,794 B1 | * | 4/2003 | Spindel et al. | 280/79.11 |

* cited by examiner

Primary Examiner—Brian L. Johnson
Assistant Examiner—Kelly E Campbell
(74) Attorney, Agent, or Firm—Sturm & Fix LLP

(57) ABSTRACT

A knock-down transport device (10) for retrieving downed game animals from remote locations wherein the transport device (10) comprises a plurality of generally rigid intermediate plate members (20) (20') (20") having leading (22) and trailing (23) edges that cooperate with one another to interlock the intermediate plate members (20) (20') (20") together; wherein, the forwardmost intermediate plate member (20) is operably associated with an elongated front panel member (40) having a curved front portion (49) and the rearwardmost intermediate plate members (20") is operatively associated with a generally L-shaped rear plate member (30); and, wherein all of the plate members (20) (30) and (40) are provided with hinged loop members (27) (37) (47) adapted to receive an elongated tether member (50) for securing a load (100) to the transport device (10).

7 Claims, 1 Drawing Sheet

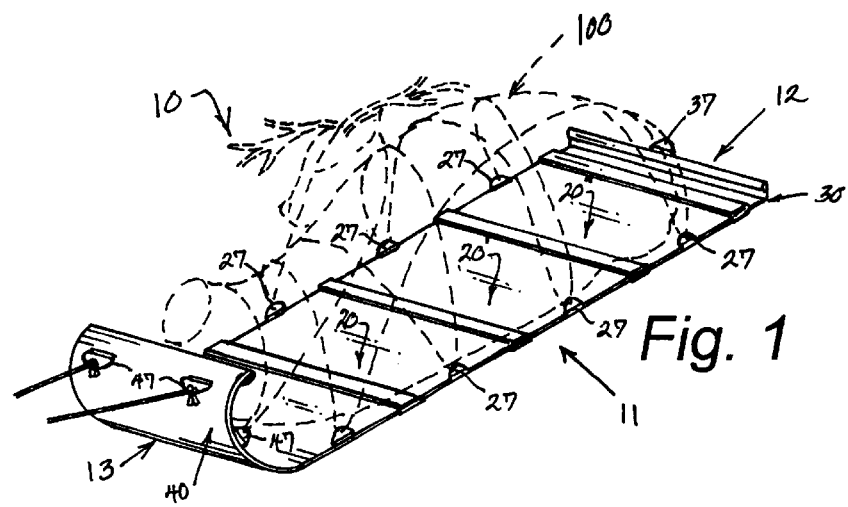
Fig. 1
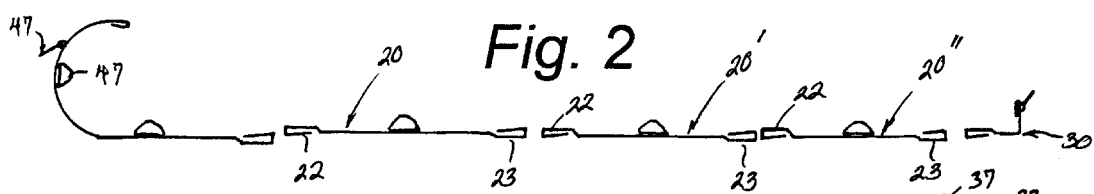
Fig. 2
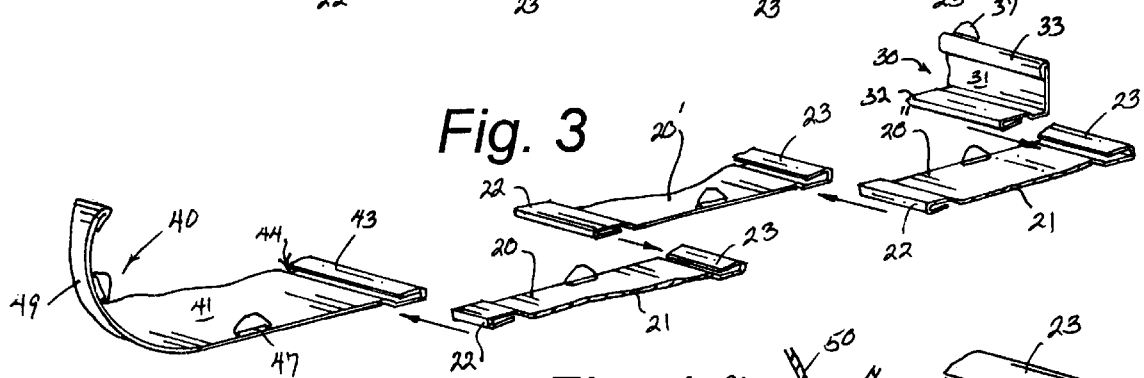
Fig. 3
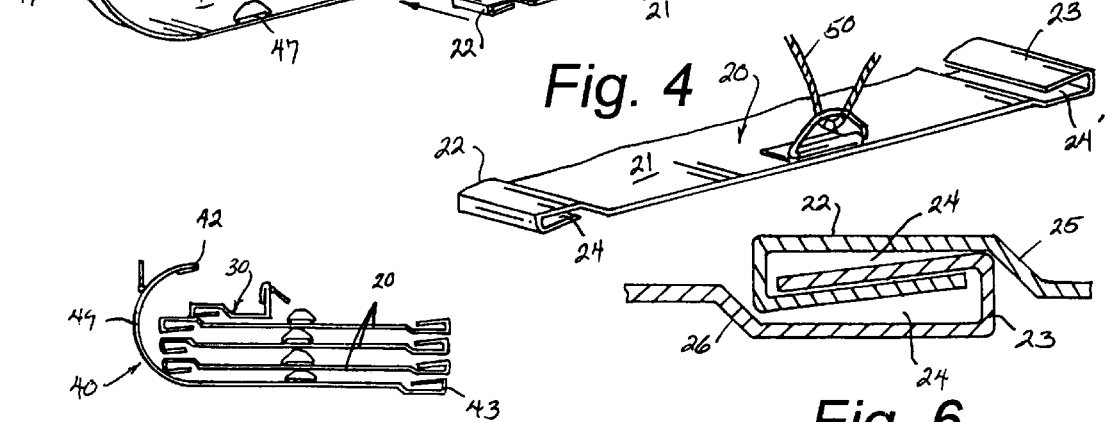
Fig. 4
Fig. 5
Fig. 6

GAME ANIMAL TRANSPORT DEVICE

CROSS REFERENCE TO RELATED APPLICATIONS

This invention was the subject matter of Disclosure Document Program registration number 475,724, filed in the U.S. Patent and Trademark Office on Jun. 19, 2000.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of collapsible transport devices in general and in particular to a knock-down sled construction for transporting a game animal from a kill site to a vehicle.

2. Description of Related Art

As can be seen by reference to the following U.S. Pat. Nos. 5,941,541; 3,771,808; 4,335,891; and, 3,982,748, the prior art is replete with myriad and diverse sled style transport devices employed for a wide variety of purposes.

While all of the aforementioned prior art constructions are more than adequate for the basic purpose and function for which they have been specifically designed, they are uniformly deficient with respect to their failure to provide a simple, efficient, and practical knock-down transport sled for hunters to retrieve downed game from the field.

As most avid hunters are all too well aware, due-to hunting pressure, it is now necessary to go deeper into the woods and further afield in order to harvest trophy caliber animals. Unfortunately, once the animal is down, the truly difficult part of the hunt begins in packing the meat, hide and horns out of the field over fairly rough and challenging terrain.

As a consequence of the foregoing situation, there has existed a longstanding need among hunters for a new and improved lightweight knock-down transport device that can easily be packed into a kill site and quickly assembled in the field to allow for the rapid retrieval of game before the meat becomes spoiled; and the provision of such a construction is a stated objective of the present invention.

BRIEF SUMMARY OF THE INVENTION

Briefly stated, the transport device comprises in general a plurality of intermediate panel units, a rear brace unit and a front curved panel unit that are joined together in a releasable interlocking fashion that can be broken down for transporting the device in a compact configuration to a point of use and quickly assembled on site without the need for specialized tools.

As will be explained in greater detail further on in the specification, all of the intermediate panel units comprise generally rectangular intermediate plate members having leading and trailing edges that define oppositely facing channel openings in a releasable interlocking fashion.

The front panel unit comprises in general an elongated rectangular front plate member having a curved front portion and a trailing edge that is adapted to releasably engage the leading edge of one of the intermediate plate members in an interlocking fashion; and, the rear panel unit comprises a generally L-shaped rear plate member having a bottom edge which is adapted to releasably engage the trailing edge of one of the intermediate plate members.

In addition, all of the plate members are provided with hinged loop elements that are adapted to receive a portion of an elongated tether member for lashing an animal carcass or portion thereof to the transport device.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the transport device that forms the basis of the present invention in use;

FIG. 2 is an exploded side elevation view of the components that comprise the transport device;

FIG. 3 is a partial exploded perspective view depicting the slidable interlocking engagement of all of the components;

FIG. 4 is an isolated detail view of one of the tie down ring elements on to one of the intermediate panel units;

FIG. 5 is a side elevation view of the components in their knocked-down storage configuration;

FIG. 6 is an isolated detail view of the interlocking lateral engagement between adjacent components.

DETAILED DESCRIPTION OF THE INVENTION

As can be seen by reference to the drawings, and in particularly to FIG. 1, the animal carcass transport device that forms the basis of the present invention is designated generally by the reference number 10. The device 10 comprises in general a plurality of intermediate panel units 11, a rear brace unit 12, and a front curved panel unit 13. These units will now be described in seriatim fashion.

As shown in FIGS. 1 through 4, each of the plurality of intermediate panel units 11 comprise a generally thin flat rectangular intermediate metal plate member 20 preferably fabricated from a sheet of 1/16" to 1/8" aluminum 21 wherein the leading edge 22 and the trailing edge 23 of each plate member 20 are bent and deformed in an inverted image fashion to form oppositely faced channel openings 24 24' the purpose and function of which will be described presently.

As can best be appreciated by reference to FIGS. 3, 4 and 6, the rear portion of the leading edge 22 of the plate member is angled upwardly as at 25 and then the leading edge 22 is folded underneath and rearwardly to create a rearwardly faced channel opening 24; whereas, the rear portion of the trailing edge 23 is angled downwardly as at 26 and folded above and forwardly to create a forwardly faced channel opening 24'.

Turning now to FIGS. 3 and 6, it can be appreciated that the intermediate metal plate members 20 20' 20" are interchangeable with one another; wherein, the leading 22 and trailing edges 23 of the middle intermediate plate member 20 are laterally engageable respectively with the trailing edge 23 of the front intermediate plate member 20 and the leading edge 22 of the rear intermediate plate member 20" in an interlocking grip configuration.

In addition, as can best be seen by reference to FIG. 1, the opposed sides of the intermediate plate members 20 20' and 20" are further provided with hinged loop elements 27 which are adapted to receive an elongated tether member 50 which is threaded through the loop elements 27 to secure a downed animal 100 as a portion thereof to the intermediate units 11 in a well recognized fashion.

Returning once more to FIGS. 1 through 3, it can be seen that the rear panel unit 12 comprises a truncated generally L-shaped rear plate member 30 likewise fabricated from aluminum 31 wherein, the bottom edge 32 of the rear plate member 30 has a configuration of the intermediate plate members 20 20' 20" and wherein, the upper edge 33 is tightly crimped to preclude hair, hide, or flesh lodging therein.

Furthermore, the vertical leg portion of the L-shaped rear plate member 30 is designed and intended to act as a stop element to limit any rearward shifting of the load on the transport device 10; wherein, the upper edge 33 of the rear plate member 30 is provided with one or more hinged loop elements 37 which are likewise intended to accept the tether member 50 for securing the load 100 on the transport device 10.

As can also be appreciated by reference to FIGS. 1 through 3, and 5, the curved front panel unit 13 comprises an elongated front plate member 40 fabricated from aluminum 41 and having a curved front position 49 that terminates in a crimped upper edge 42 wherein the trailing edge 43 of the curved front plate member 40 has a configuration virtually identical to the trailing edge 23 of the intermediate plate members 20 such that the forwardly facing channel opening 44 of the front plate member 40 is dimensioned to laterally receive the rearwardly facing leading edge 22 of the forward most intermediate plate members 20 20' 20".

In addition, both the front face of the curved front portion 49 and the opposed sides of the front plate member 40 are provided with a plurality of hinged loop elements 47 the purpose and function of which, by now, should be self evident.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

What is claimed is:

1. A knock-down transport device for retrieving game from remote locations wherein the device comprises a plurality of intermediate panel units wherein each of the intermediate panel units includes a generally flat rectangular intermediate plate member having a leading edge and a trailing edge adapted to selectively and releasably engage the trailing edge and leading edge respectively of another mirror image flat rectangular plate member;

a plurality of hinged loop elements associated with the opposed sides of the intermediate plate members; wherein, the hinged loop elements are adapted to receive an elongated tether member for lashing an animal carcass on top of the intermediate panel units;

a front panel unit including an elongated rectangular front panel member having a curved front portion and a trailing edge that is adapted to receive the leading edge of the intermediate plate members wherein, the leading edges of the intermediate plate members have a rearwardly directed channel opening and the trailing edges of the intermediate plate members as well as the trailing edge of the front panel member have a forwardly directed channel opening; and, wherein, said trailing edges are all provided with a rear portion that is angled downwardly and then folded back on top of itself to form a forwardly directed channel opening.

2. The transport device as in claim 1; wherein, the front plate member is provided with a plurality of hinged loop elements.

3. The transport device as in claim 2; wherein, at least some of the plurality of hinged loop elements on the front plate member are disposed on the opposed sides of the front plate member.

4. The transport device as in claim 3; wherein, a pair of the plurality of hinged loop elements are disposed on the front face of the curved portion of the front plate member.

5. The transport device as in claim 1; wherein, said leading edges are all provided with a front portion which is angled upwardly and then folded underneath itself to form a rearwardly directed channel opening.

6. The transport device as in claims 5 further comprising:

a rear panel unit including a generally L-shaped rear plate member having a bottom edge that is adapted to releasably engage the trailing edge of an intermediate plate member.

7. The transport device as in claim 6; wherein, the rear plate member has a vertical leg portion the upper end of which is provided with at least one hinged loop element.

* * * * *